Patented Aug. 24, 1954

2,687,383

UNITED STATES PATENT OFFICE 2,687,383

ION-EXCHANGE RESINS FROM DIHYDROXY BENZENES OR PHENOL SULFONIC ACID AND POLYFUNCTIONAL UNSATURATED COMPOUNDS

Gaetano F. D'Alelio, Pittsburgh, Pa., assignor to Koppers Company, Inc., a corporation of Delaware No Drawing. Application September 24, 1949, Serial No. 117,725

12 Claims. (Cl. 260—2.2)

This invention relates to new ion-exchange resins. More particularly it relates to the preparation of ion-exchange resins from phenolic bodies and polyfunctional unsaturated compounds.

Ion-exchange resins have been found desirable for a wide variety of commercial uses. For example, such resins are being used in the purification, deionization and softening of water, the recovery of magnesium from sea water and brine, the recovery of copper and ammonia from waste cuprammonium solutions in rayon plants, the recovery of amino acids from protein hydrolyzates, recovery of certain vitamins from solutions, the separation of fission products obtained from uranium and plutonium, the separation of rare earths, the removal of sodium and copper from oils, the removal of iron and copper from acid liquors, various applications in analytical determinations and in catalyzing esterification, ester hydrolysis, sucrose inversion, etc., and even for the treatment of peptic ulcers.

Among the condensation type of ion-exchange resins used for many of these purposes are the resorcinol-formaldehyde, quebraco-formaldehyde and phenolsulfonic acid-formaldehyde resins. These resins are not as satisfactory and as completely effective in ion-exchange as is desired. It is believed that the close packing of phenol nuclei effected by aldehyde condensations may interfere with the availability of the active polar groups for ion-exchange since in phenol-aldehyde condensations the phenol nuclei are separated by only a single carbon atom.

It has now been found that very useful water-insoluble, ion-exchange resins can be prepared by the reaction of phenolic compounds, including, polyhydric phenols, sulfonated phenols, natural tannins and extracts, etc., with polyfunctional unsaturated compounds of various types which give more spacing between phenolic molecules, such as dialkenyl aryl compounds, aliphatic polyene compounds, cyclic polyenes, alkenyl halides, vinyl ethinyl compounds, etc. in the presence of alkylation catalysts. These polyfunctional unsaturated compounds are generally used in a proportion of more than a 1:1 molecular ratio of difunctional unsaturated compound to phenolic compound, advantageously a ratio of at least 1.1 to 1 or greater. Obviously compounds of higher functionality, such as trivinyl benzene, etc. can be used in lower proportions, for example with a trifunctional compound the ratio should be more than 0.66 to 1.

Phenolic materials which can be used in the practice of the invention are phenolic compounds having at least three nuclear reactive positions and include, resorcinol, catechol, pyrogallol, dihydroxy diphenyls, dihydroxy naphthalenes and natural tannins such as inebracho, logwood, fustic, larch bark extract, Indian acacia cutch, gambier, quebraco, mangrove, wattle bark extract, liquid hemlock, liquid mimosa, etc. In addition, sulfonated phenolic bodies can also be used. Examples of sulfonated phenolic compounds which can be alkylated by the polyfunctional unsaturated compounds to give ion-exchange resins in accordance with the present invention are p-phenol sulfonic acid, m-cresol sulfonic acid, resorcinol sulfonic acid, omega-cresol sulfonic acid, etc. Preferred phenolic bodies are those having two or more hydroxy groups, or one or more hydroxy groups plus a sulfonic acid group. The phenolic bodies, especially the monohydric phenols, may advantageously be sulfonated either before or after the alkylation step.

Various types of alkylating addition agents can be used, for example, polyalkenyl aryl compounds such as divinyl benzenes, divinyl toluenes, divinyl chlorobenzenes, divinyl naphthalenes, trivinyl naphthalenes, divinyl diphenyls, diisopropenyl benzenes, dimethallyl benzenes, diallyl benzenes, triallyl toluene, vinyl isopropenyl benzenes, allyl styrenes, allyl isopropenyl benzene, diisopropenyl naphthalenes, diisopropenyl diphenyls, di-(3-buten-1-yl) - benzene, etc.; aliphatic polyene compounds, such as butadiene-1,3, isoprene, 2,3-dimethyl-butadiene-1,3, piperylene, chloroprene, myrcene, allo-ocimene, ocimene, etc.; cyclic polyenes, such as cyclohexadiene, cyclopentadiene, chloro-cyclopentadiene, dicyclopentadiene, vinyl cyclohexenes, etc.; alkenyl halides such as methallyl chloride, allyl chloride, vinyl chloride, vinylidene chloride, 1-fluoro - 1 - chloro-ethylene, 4-chloro-butene-1, pentenyl chlorides, etc.; vinyl ethinyl compounds such as vinyl acetylene, divinyl acetylene, vinyl ethinyl carbinol, etc.; doubly unsaturated ethers such as divinyl ether, vinyl allyl ether, diallyl ether, dimethallyl ether, allylphenyl allyl ether, vinylphenyl allyl ether, etc.

The reaction between the phenolic material and the unsaturated compound is catalyzed by alkylation catalysts such as the strong ionic acidic catalyst of the Friedel-Crafts-type and acid catalysts, e. g., $AlCl_3$, $BF_3$, $SnCl_4$, $ZnCl_2$, $FeCl_3$, various double salts and derivatives or complexes of these compounds, e. g., borofluoroacetic acid, $(AlCl_3)_6 \cdot AlO(OC_2H_5)$, etc., and sulfuric acid, phosphoric acid, hydrogen fluoride, hydrogen chloride, etc. In addition to the alkylation reaction these catalysts may also effect some polymerization. In such cases, dimers, trimers, tetramers, etc. of the polyfunctional unsaturated compounds serve as cross-linking agents upon alkylation. In the reaction of resorcinol with p-divinyl benzene a possible structure for the product obtained by p-divinyl benzene monomer alkylation of resorcinol is represented as follows:

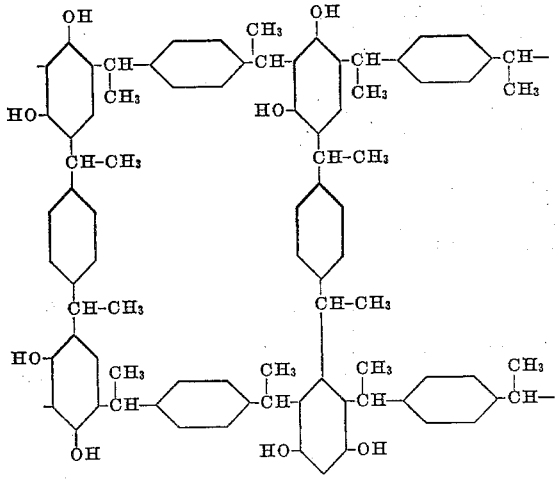

A possible structure of a p-divinyl benzene and p-phenol sulfonic acid alkylation product is represented as follows:

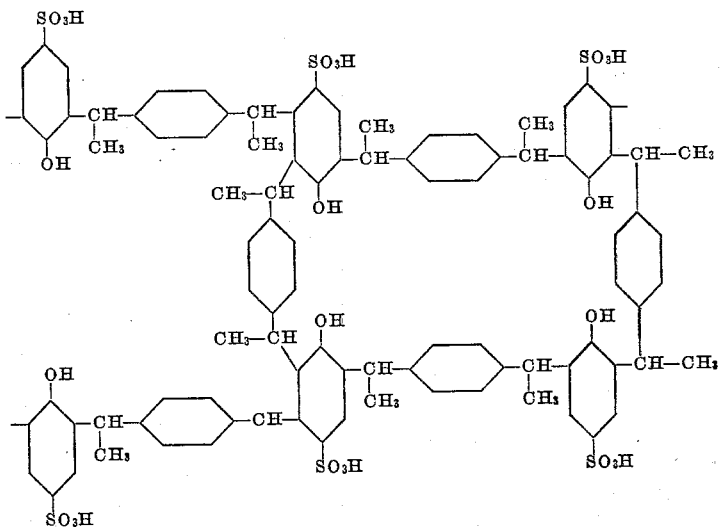

A typical procedure for the preparation of the ion-exchange resins of the present invention is as follows: To a mixture of 110 parts of resorcinol and 200 parts of divinyl benzene is added with stirring 0.5 part of 96% sulfuric acid. The mixture is allowed to stand for 30 minutes before aqueous sodium carbonate solution is added to neutralize the acid. The resultant mass is filtered to separate the precipitated resin from the aqueous solution and the resin is comminuted and subsequently given a water wash. The resin, in powder or granular form, is then ready for ion-exchange purposes.

It will be seen that the catalyst was added at room temperature to a mixture of the phenolic compound and the polyfunctional, unsaturated compound, and the reaction allowed to proceed under autogenous temperature conditions.

As mentioned previously, other phenolic compounds, including sulfonated phenols and natural tannins can be reacted in place of resorcinol according to this procedure, for example, catechol, 1,4-dihydroxy naphthalene, p,p'-dihydroxydiphenyl, 4-phenol sulfonic acid, 1,4-naphthol sulfonic acid, inebracho, logwood, fustic, etc. Moreover, other polyfunctional cross-linking agents can be substituted for the divinyl benzene, for example, divinyl naphthalene, divinyl diphenyl, butadiene, isoprene, cyclopentadiene, cyclohexadiene, vinyl cyclohexene, methallyl chloride, allyl chloride, etc., and various other alkylation catalysts can be used, for example, $AlCl_3$, $ZnCl_2$, $HF$, $HCl$, etc. as listed hereinbefore.

These resins possess adsorptive capacity for removing many types of cations from alkaline, neutral or slightly acidic aqueous and other types of solutions. For example, such resins will adsorb from a calcium chloride solution a certain amount of calcium which cannot be removed from the resin by washing with water but which can be removed by washing with dilute acid, such as a 5% solution of hydrochloric acid, or with an excess of a 5% solution of sodium chloride, in which latter case the sodium replaces the calcium. The types of cations which are adsorbed by the resins of this invention include, in addition to sodium and calcium, potassium, iron, bismuth, lead, magnesium, cobalt, nickel ions, etc. In fact any cations which react with the phenolic hydroxyl groups, or with sulfonic acid groups, when such acid groups are present in the resin, will be effectively removed from solution. As mentioned previously the cation-adsorptive capacity of the resins may be regenerated by treatment by washing with dilute acid, preferably a mineral acid which forms soluble salts with the adsorbed cations.

An inert material such as diatomaceous earth, Alundum, coke, silica, cinders, porous glass, etc. may be used as a carrier for the resin in order to increase the effective surface of the resin for ion-exchange. These carriers may be introduced by adding them at any time prior to complete polymerization of the monomers to an infusible, insoluble state.

When a sulfonated resin is desired, various sulfonating agents can be used, such as chlorosulfonic acid, concentrated sulfuric acid, etc., either on the phenolic raw materials or on the resinous products. The sulfonation reactions can be effected on various forms of the resins, e. g., powder, bead, pellet, coating, etc. However, since the ion-exchange utility of the product is related to effective surface, it is often advantageous to have the resins shaped in the particular physical form in which it will ultimately be used so that the greatest concentration of sulfonic acid groups will be on easily accessible surfaces.

While there are above disclosed but a limited number of embodiments of the invention, it is possible to produce still other embodiments without departing from the inventive concept herein disclosed; and it is, therefore, desired that only such limitations be imposed upon the appended claims as are stated therein or required by the prior art.

What is claimed is:

1. An infusible, insoluble resin comprising the reaction product obtained by forming a mixture consisting solely of (1) a phenolic compound of the formula

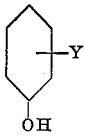

in which Y is chosen from the group consisting of the —OH and —SO$_3$H radicals, (2) a polyfunctional unsaturated compound of the class consisting of polyalkenyl aryl, aliphatic polyene, cycloaliphatic polyene, vinyl ethinyl hydrocarbon compounds, alkenyl halides and doubly unsaturated nonbenzenoid, unsubstituted ethers, the mole proportion of said compound being more than one of unsaturated compound per mole of phenolic compound, and (3) a strong ionic acidic catalyst, said catalyst being added at room temperature with stirring to said phenolic and polyfunctional unsaturated constituents and allowing the reaction to proceed under autogenous temperature conditions.

2. An insoluble, infusible resin comprising the reaction product obtained by forming a mixture of 110 parts resorcinol, 200 parts divinylbenzene and 0.5 part of 96% sulfuric acid, said sulfuric acid being added at room temperature with stirring to said resorcinol and divinylbenzene and allowing the reaction to proceed under autogenous temperature conditions.

3. The method of treating liquid media to remove cations therefrom which comprises contacting said media with a water-insoluble resin and separating said resin from the liquid media, said resin comprising the reaction product obtained by forming a mixture consisting solely of (1) a phenolic compound of the formula

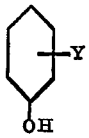

in which Y is chosen from the group consisting of the —OH and —SO$_3$H radicals, (2) a polyfunctional unsaturated compound of the class consisting of polyalkenyl aryl, aliphatic polyene, cycloaliphatic polyene, vinyl ethinyl hydrocarbon compounds, alkenyl halides and doubly unsaturated nonbenzenoid, unsubstituted ethers, the mole proportion of said compound being more than one of unsaturated compound per mole of phenolic compound, and (3) a strong ionic acidic catalyst, said catalyst being added at room temperature with stirring to said phenolic and polyfunctional unsaturated constituents and allowing the reaction to proceed under autogenous temperature conditions.

4. The method of claim 3 in which the phenolic compound is resorcinol and the polyfunctional unsaturated compound is divinylbenzene.

5. A water-insoluble resin of claim 1, in which the unsaturated compound is a divinyl aryl compound.

6. A water-insoluble resin of claim 1, in which the unsaturated compound is a divinyl benzene.

7. A water-insoluble resin of claim 1, in which the unsaturated compound is a divinyl naphthalene.

8. A water-insoluble resin of claim 1, in which the unsaturated compound is an alkenyl halide.

9. A water-insoluble resin of claim 1, in which the unsaturated compound is allyl chloride.

10. A water-insoluble resin of claim 5, in which the phenolic compound is resorcinol.

11. A water-insoluble resin of claim 6, in which the phenolic compound is resorcinol.

12. A water-insoluble resin of claim 5, in which the phenolic compound is a phenol sulfonic acid.

References Cited in the file of this patent

UNITED STATES PATENTS

| Number | Name | Date |
|---|---|---|
| 2,224,837 | Rosenthal | Dec. 10, 1940 |
| 2,246,762 | Schirm | June 24, 1941 |
| 2,319,359 | Wassenegger | May 18, 1943 |
| 2,459,835 | Monroe | Jan. 25, 1949 |
| 2,527,300 | Dudley | Oct. 24, 1950 |
| 2,553,470 | Pines | May 15, 1951 |

FOREIGN PATENTS

| Number | Country | Date |
|---|---|---|
| 154,180 | Switzerland | July 16, 1932 |
| 609,477 | Germany | June 2, 1935 |
| 904,101 | France | Feb. 19, 1945 |